Dec. 2, 1930.  F. P. RADCLIFFE  1,783,855
SIGNAL
Filed Dec. 21, 1928   3 Sheets-Sheet 1
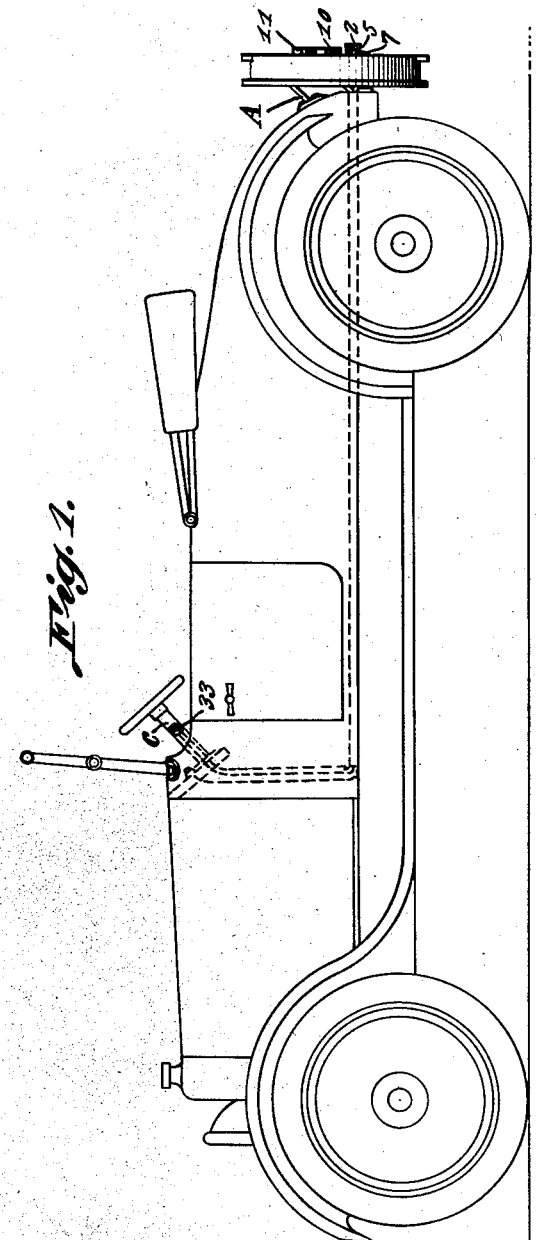
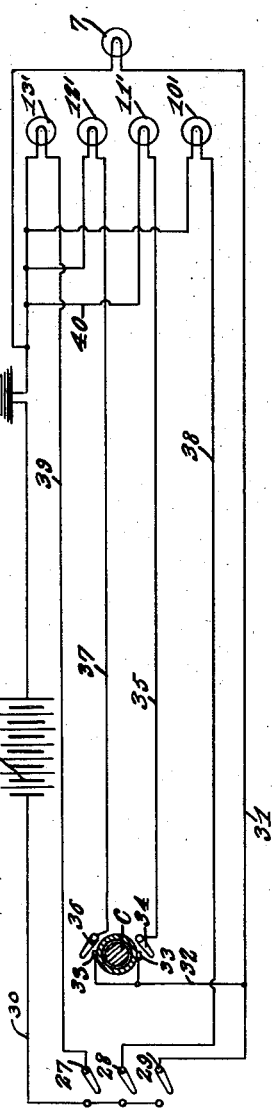
F. P. Radcliffe, INVENTOR
BY Victor J. Evans
ATTORNEY Dec. 2, 1930.  F. P. RADCLIFFE  1,783,855
SIGNAL
Filed Dec. 21, 1928  3 Sheets-Sheet 2

F. P. Radcliffe, INVENTOR
BY Victor J. Evans
ATTORNEY

Dec. 2, 1930.  F. P. RADCLIFFE  1,783,855
SIGNAL
Filed Dec. 21, 1928   3 Sheets-Sheet 3
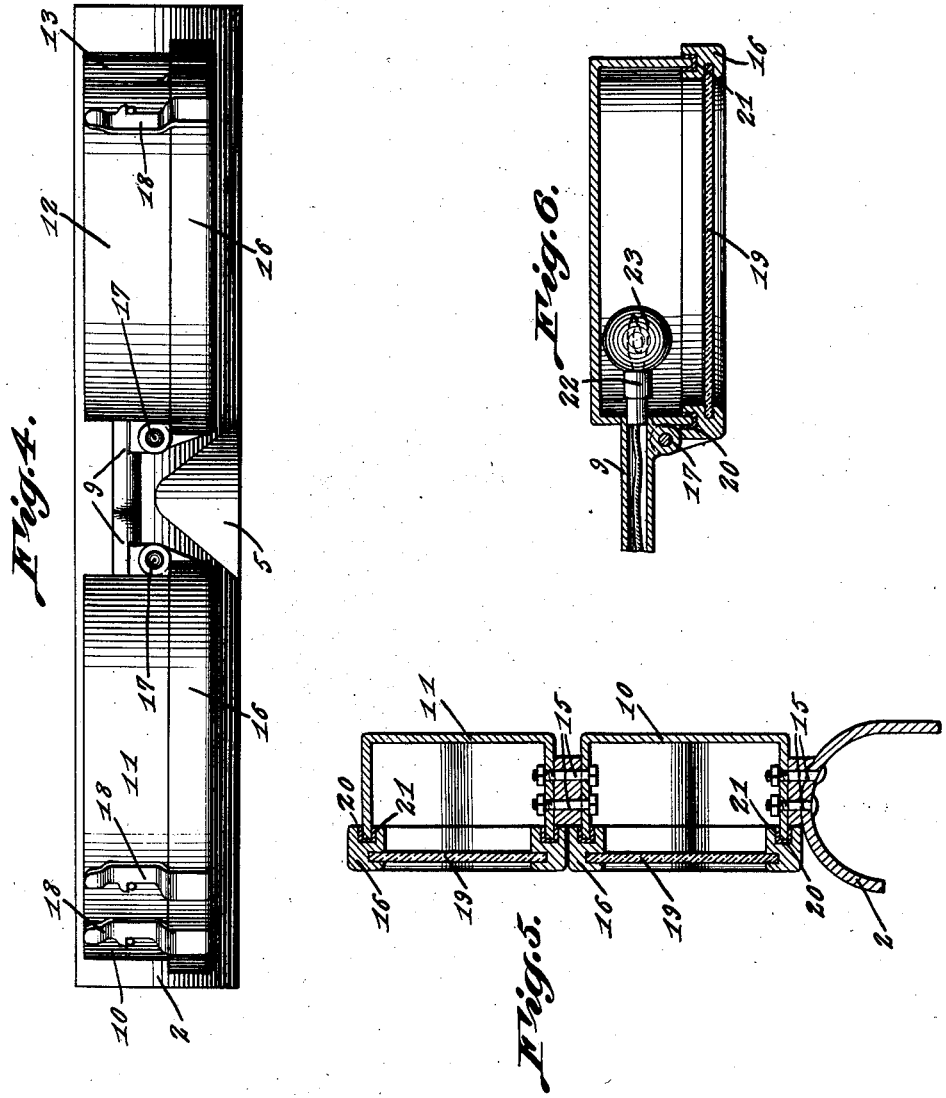
F. P. Radcliffe, INVENTOR
BY Victor J. Evans
ATTORNEY Patented Dec. 2, 1930

1,783,855

UNITED STATES PATENT OFFICE

FRANK P. RADCLIFFE, OF FAIRMONT, WEST VIRGINIA

SIGNAL

Application filed December 21, 1928. Serial No. 327,650.

This invention relates to a signal for motor vehicles and the like, the general object of the invention being to provide a series of signal casings so arranged on the supporting member that they form a cloverleaf design, each casing having a transparent front, with the word "Stop" on the transparent member of one casing, a hand pointing to the left on the transparent member of another casing, a hand pointing to the right on the transparent member of the third casing, the fourth casing being designed for use as a backing light, each casing having a lamp therein, with circuit closing means for the lamps.

Another object of the invention is to provide a license plate holder which is formed with a hood for directing the rays of light from a lamp under the hood on to the plate, with means for attaching the signal assembly to the hood.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which :—

Figure 1 is a view of an automobile, showing the invention in use.

Figure 4 is a top plan view of the signal means placed on the hood of the license plate carrier.

Figure 5 is a section on line 5—5 of Figure 2.

Figure 6 is a horizontal sectional view through one of the casings.

Figure 7 is a diagrammatic view of the circuits.

Figures 2, 3:
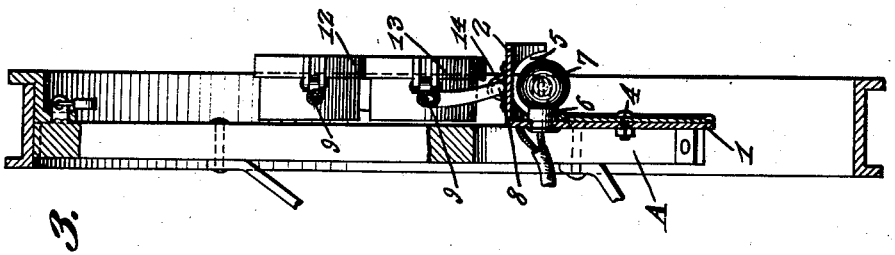
Figure 2 is a view of the spare tire carrier, with the signal means and the license plate holder attached thereto.
Figure 3 is a section on line 3—3 of Figure 2.

In these drawings, the numeral 1 indicates a plate-like member, having a hood 2 at its upper end, to which the license plate 3 is attached by the bolts 4, this member 1 being adapted to be suitably fastened to the carrier A of the spare tire of a motor vehicle, as shown in Figure 2. The hood is formed with a recess 5 at its center and a lamp socket 6 is carried by the member 1 in rear of the recess so that the tail lamp 7 placed in the socket is visible through the recess. The hood directs some of the rays of light from this lamp on to the license plate.

A tube 8, with branches 9, is shaped as shown in Figure 2, to simulate the stem of a cloverleaf, and casings 10, 11, 12 and 13 are fastened to the stems, these casings being shaped to simulate a cloverleaf. The stem is fastened to the top part of the hood by the clips 14. The casings are arranged in pairs, with the members of each pair connected together by the bolts 15 and the front part of each casing is open, with a door 16 closing the opening. Each door is connected to its branch 9 by the hinge 17 and each door is held closed by the latch 18. Each door comprises a frame carrying a transparent member 19, with a groove 20 in the inner face of the frame for receiving the edges of the casing. A packing strip 21 may be placed in the groove to form a tight joint when the door is closed. A socket 22 is arranged in each casing for receiving a bulb 23.

The casing 10 has the word "Stop" on its transparent member, as shown at 24, and the casing 11 has the representation of a hand 25 on its transparent member, which points to the left and the representation of a hand 26 pointing to the right is placed on the transparent member in the casing 12. The transparent member of the casing 13 is of clear glass so that when the lamp in this casing is lighted, the road in rear of the automobile is illuminated so as to facilitate backing of the vehicle. As shown, the casings are of substantially oval shape with their inner ends larger than their outer ends so that the casings acting as the right and left hand signals point in the direction the turns are to be made, and thus act with the representation of the hands to indicate the direction of the turns. The other casings are made in the same shape to give the device a uniform appearance.

The conductors for the lamps pass through the tube 8 and through suitable tubing to the front part of the vehicle.

Figure 7 shows a circuit arrangement which may be used for the lamps. This arrangement comprises the three switches 27, 28 and 29 arranged on the instrument board of the vehicle and having their contacts connected by a conductor 30 with the battery B. The switch arm 29 is connected by a conductor 31 with the tail lamp 7. The conductor 31 is also connected by a conductor 32 with the terminals 33 on the steering post C of the vehicle, one of these contacts 33 engaging a contact 34 when the vehicle is turned to the left, this contact being connected by a conductor 35 with the lamp 11' in the casing 11, so that when the vehicle is turned to the left, the lamp 11' will be lighted so as to indicate that the vehicle is making a left hand turn. When the vehicle is turned to the right, the other contact 33 will engage a contact 36 which is connected by a conductor 37 with the lamp 12' in the casing 12 so that said lamp will be lighted to illuminate the right hand signal to indicate that the vehicle is making a right hand turn. When the switch 28 is closed, the circuit to the lamp 10' in casing 10 will be closed through the conductor 38 so that the stop signal will be illuminated to indicate that the vehicle is stopping and when the switch 27 is closed, the lamp 13' in casing 13 will be lighted, the current passing over a conductor 39 so that the road in rear of the vehicle will be illuminated to facilitate the backing. The lamps are all grounded by the conductors 40.

From the foregoing it will be seen that I have provided an attractive signal means which is associated with a license plate holder and illuminator, the signal means being arranged to give a "stop" signal, right and left turning signals and a lamp for illuminating the road in rear of a vehicle.

It is thought from the foregoing description that the advantages and novel features of the invention will be readily apparent.

It is to be understood that changes may be made in the constructon and in the combination and arrangement of the several parts, provided that such changes fall within the scope of the appended claims.

What I claim is:—

1. A direction signal for motor vehicles comprising an elongated supporting plate to support a license tag, a hood formed on the upper edge of the plate and having a centrally arranged curved portion, a tubular member having a horizontal portion secured to the upper portion of said hood and extending toward one end of the hood and laterally of the curved portion thereof, said tubular member bent to extend upwardly from the hood to provide a vertical supporting portion and curved slightly back upon said horizontal portion and having its free end spaced a considerable distance from the hood, pairs of oppositely disposed branch members formed on the vertical supporting portion of the tubular member, casings secured to the ends of the branch members, electric lamps in the casings, said casings arranged in oppositely disposed pairs and one pair arranged above the other pair, covers for the casings and having direction characters thereon to be illuminated by the electric lamps, one of the casings of the lower pair on the opposite side of the stem from the horizontal portion of the tubular member secured to the hood.

2. A direction signal for motor vehicles comprising an elongated supporting plate to support a license tag, a hood formed on the upper edge of the plate and having a centrally arranged curved portion, a tubular member having a horizontal portion secured to the upper portion of said hood and extending toward one end of the hood and laterally of the curved portion thereof, said tubular member bent to extend upwardly from the hood to provide a vertical supporting portion and curved slightly back upon said horizontal portion and having its free end spaced a considerable distance from the hood, pairs of oppositely disposed branch members formed on the vertical supporting portion of the tubular member, casings secured to the ends of the branch members, electric lamps in the casings, said casings arranged in oppositely disposed pairs and one pair arranged above the other pair, covers for the casings and having direction characters thereon to be illuminated by the electric lamps, one of the casings of the lower pair on the opposite side of the stem from the horizontal portion of the tubular member secured to the hood, and fasteners securing the casings of each pair together, said centrally arranged curved portion of the hood receiving a tail lamp.

In testimony whereof I affix my signature.

FRANK P. RADCLIFFE.